(12) United States Patent
Watanabe

(10) Patent No.: US 10,339,637 B2
(45) Date of Patent: Jul. 2, 2019

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR CORRECTING DETERIORATION OF IMAGE

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/208,675

(22) Filed: Jul. 13, 2016

(65) Prior Publication Data

US 2017/0024866 A1 Jan. 26, 2017

(30) Foreign Application Priority Data

Jul. 24, 2015 (JP) ................................ 2015-147007

(51) Int. Cl.
*G06K 9/40* (2006.01)
*G06T 5/00* (2006.01)

(52) U.S. Cl.
CPC .................... *G06T 5/003* (2013.01)

(58) Field of Classification Search
CPC ................. G06T 9/003; G06T 9/006
See application file for complete search history.

(56) References Cited

U.S. PATENT DOCUMENTS 6,154,574 A * 11/2000 Paik ..................... G06T 5/003
250/201.2
7,728,844 B2 * 6/2010 Trimeche ............... H04N 9/045
345/589

(Continued)

FOREIGN PATENT DOCUMENTS

JP 2009267523 A 11/2009
JP 2013025473 A 2/2013

(Continued)

OTHER PUBLICATIONS

Richardson. "Bayesian-Based Iterative Method of Image Restoration." Journal of the Optical Society of America. Jan. 1972: 55-59. vol. 62, No. 1.

*Primary Examiner* — Samir A Ahmed
(74) *Attorney, Agent, or Firm* — Rossi, Kimms & McDowell LLP

(57) ABSTRACT

An image processing apparatus (600) includes a determiner (607) which determines correction data for each of a plurality of positions in an image based on a point spread function (PSF) relating to each of the plurality of positions, and an image restorer (608) which repeats predetermined image processing by using the correction data to perform image restoration processing, the image restorer is configured to repeat the predetermined image processing N times (N is a positive integer) to perform the image restoration processing, the predetermined image processing includes processing of generating an (n+1)-th intermediate image based on an n-th image (1≤n≤N), and processing of generating an (n+1)-th image based on the (n+1)-th intermediate image, the n-th image, and the correction data, and the correction data are coefficient data for a difference between the (n+1)-th intermediate image and the n-th image.

11 Claims, 6 Drawing Sheets

(56) References Cited

U.S. PATENT DOCUMENTS

| | | | | |
|---|---|---|---|---|
| 7,983,509 | B1* | 7/2011 | Banner | G06T 5/003 382/266 |
| 9,477,140 | B2* | 10/2016 | Okazawa | G02B 7/34 |
| 2005/0204329 | A1* | 9/2005 | Pauca | G06T 5/003 716/55 |
| 2007/0165961 | A1* | 7/2007 | Lu | G06T 5/50 382/254 |
| 2009/0179999 | A1* | 7/2009 | Albu | G06T 3/4053 348/222.1 |
| 2010/0080487 | A1* | 4/2010 | Yitzhaky | G06T 5/003 382/266 |
| 2012/0045095 | A1* | 2/2012 | Tate | G06T 5/003 382/103 |
| 2012/0050583 | A1* | 3/2012 | Watanabe | G06T 5/003 348/241 |
| 2012/0105655 | A1* | 5/2012 | Ishii | G06T 5/003 348/208.4 |
| 2013/0050539 | A1* | 2/2013 | Watanabe | G06T 5/003 348/241 |
| 2013/0243346 | A1* | 9/2013 | Cho | G06T 5/003 382/255 |

FOREIGN PATENT DOCUMENTS

| | | |
|---|---|---|
| JP | 2015146121 A | 8/2015 |
| JP | 5809865 B2 | 11/2015 |

\* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM FOR CORRECTING DETERIORATION OF IMAGE

BACKGROUND OF THE INVENTION

Field of the Invention

The present invention relates to an image processing apparatus which corrects a deterioration of an image caused by an image pickup optical system.

Description of the Related Art

For an object captured via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the captured image is formed with the PSF convolved with the image, and accordingly, the image is blurred and its resolution is deteriorated.

Recently, the captured image is typically stored as electronic data, and a method (image restoration processing) of correcting the deterioration of the image caused by the image pickup optical system has been proposed. The deterioration state of the image varies depending on a position in the image.

Japanese Patent Laid-open No. 2013-25473 discloses an image processing method of performing optimum restoration processing depending on a deterioration state at each position in an image while reducing a calculation amount even when an image deterioration varies depending on the position according to a lens characteristic. The literature "OSA VOLUME 62, NUMBER 1 Jan. 1972 Bayesian-Based Iterative Method of Image Restoration" discloses an image restoration method by an iterative calculation using so-called Lucy-Richardson method.

When the number of iterations is not appropriately set in performing the image restoration processing by using the iterative calculation, the cost of calculation increases. Furthermore, in many cases, the number of iterations of calculation is a dominant factor with respect to the strength of the image restoration. For example, if the number of iterations of calculation is insufficient, the degree of the restoration is insufficient. On the contrary, if the number of iterations of calculation is too large, the degree of the restoration is excessive, which results in occurrence of a harmful effect such as ringing. Accordingly, it is necessary to set the number of iterations appropriately depending on characteristics of the image deterioration at a position or a region in the image. When the image restoration processing is performed with an appropriate strength, a method of terminating the iterative calculation processing based on a certain evaluation value is typically used.

When the image on which the restoration processing is to be performed is extremely large or the deterioration characteristic of the image varies depending on the position or the region in the image, it is difficult to terminate the iterative calculation processing appropriately by comparing the RMS (Root Mean Square) of an image which is not updated with the RMS of an updated image. When the deterioration characteristic of the image varies depending on the position or the region in the image, satisfactory correction cannot be performed only by controlling the number of iterations. In order to achieve appropriate image restoration, it is necessary to control a correction amount appropriately during each iterative calculation processing.

However, neither Japanese Patent Laid-open No. 2013-25473 nor the literature "OSA VOLUME 62, NUMBER 1 JANUARY 1972 Bayesian-Based Iterative Method of Image Restoration" describes these specific control methods. Accordingly, with respect to an arbitrary combination of an image pickup optical system and an image sensor, it is difficult to control a correction amount appropriately in the iterative calculation processing for a shift-variant deterioration in an image to perform appropriate image restoration processing for each position in the image.

SUMMARY OF THE INVENTION

The present invention provides an image processing apparatus, an image pickup apparatus, an image processing method, and a non-transitory computer-readable storage medium which are capable of restoring a deterioration of an image appropriately depending on a position in an image.

An image processing apparatus as one aspect of the present invention includes a determiner configured to determine correction data for each of a plurality of positions in an image based on a point spread function relating to each of the plurality of positions, and an image restorer configured to repeat predetermined image processing by using the correction data to perform image restoration processing, the image restorer is configured to repeat the predetermined image processing N times (N is a positive integer) to perform the image restoration processing, the predetermined image processing includes processing of generating an (n+1)-th intermediate image based on an n-th image ($1 < n \leq N$), and processing of generating an (n+1)-th image based on the (n+1)-th intermediate image, the n-th image, and the correction data, and the correction data are coefficient data for a difference between the (n+1)-th intermediate image and the n-th image.

An image pickup apparatus as another aspect of the present invention an image sensor configured to photoelectrically convert an optical image formed via an image pickup optical system to output an image signal, a determiner configured to determine correction data for each of a plurality of positions in an image generated from the image signal based on a point spread function relating to each of the plurality of positions, and an image restorer configured to repeat predetermined image processing by using the correction data to perform image restoration processing, the image restorer is configured to repeat the predetermined image processing N times (N is a positive integer) to perform the image restoration processing, the predetermined image processing includes processing of generating an (n+1)-th intermediate image based on an n-th image ($1 < n \leq N$), and processing of generating an (n+1)-th image based on the (n+1)-th intermediate image, the n-th image, and the correction data, and the correction data are coefficient data for a difference between the (n+1)-th intermediate image and the n-th image.

An image processing method as another aspect of the present invention includes the steps of determining correction data for each of a plurality of positions in an image based on a point spread function relating to each of the plurality of positions; and repeating predetermined image processing by using the correction data to perform image restoration processing, the step of performing the image restoration processing includes repeating the predetermined image processing N times (N is a positive integer), the predetermined image processing includes the steps of generating an (n+1)-th intermediate image based on an n-th image (1≤n≤N), and generating an (n+1)-th image based on the (n+1)-th intermediate image, the n-th image, and the correction data, and the correction data are coefficient data for a difference between the (n+1)-th intermediate image and the n-th image.

A non-transitory computer-readable storage medium as another aspect of the present invention stores a program causing a computer to execute a process comprising the steps of determining correction data for each of a plurality of positions in an image based on a point spread function relating to each of the plurality of positions, and repeating predetermined image processing by using the correction data to perform image restoration processing, the step of performing the image restoration processing includes repeating the predetermined image processing N times (N is a positive integer), the predetermined image processing includes the steps of generating an (n+1)-th intermediate image based on an n-th image (1≤n≤N), and generating an (n+1)-th image based on the (n+1)-th intermediate image, the n-th image, and the correction data, and the correction data are coefficient data for a difference between the (n+1)-th intermediate image and the n-th image.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First of all, an outline of an image processing method (image restoration processing) in this embodiment will be described. Expression (1) below is satisfied where, in a real space (x,y), f(x,y) is an image which is not deteriorated by an image pickup optical system (optical system), h(x,y) is a PSF (point spread function), and g(x,y) is a deteriorated image.

$$g(x,y) = \iint f(X,Y) * h(x-X, y-Y) dX dY \qquad (1)$$

The image restoration processing by using the Lucy-Richardson method (LR method) is represented by expression (2) below in a real space.

$$f_{n+1}(x, y) \leftarrow f_n(x, y) \iint \frac{h(X-x, Y-y)g(X, Y)}{\iint h(X-s, Y-t)f_n(s, t)dsdt} dX dY \qquad (2)$$

In expression (2), symbol $f_{n+1}$ is an image which is updated (updated image) and symbol $f_n$ is an image before updating. Symbol h is a deterioration characteristic of the image pickup optical system, and for example it is a PSF. Symbol g is a deteriorated image.

In the image restoration processing by using the LR method, the image $f_n$ is sequentially updated until the processing is discontinued according to, for example, a predetermined evaluation criterion, and then the image $f_{n+1}$ is output. The evaluation criterion for the processing includes, for example, a value of root mean square (RMS) of the images $f_{n+1}$ and $f_n$. The image restoration processing may start with the setting of $f_0=g$ as an initial value (when starting the LR method).

In order to apply the image restoration processing to an image captured by a digital camera, various measures are necessary. First, an image captured by using a typical digital camera has a deterioration characteristic (degradation characteristic) which varies depending on a position in the image. Furthermore, in many cases, the image may be asymmetrically deteriorated in the periphery of the image because an aberration of an image pickup optical system is large. This means that an amount of the image deterioration which is to be corrected varies depending on a position or a region in the image, and accordingly it is necessary to perform appropriate processing on each region. In addition, assuming an environment in which there are a number of combinations of the image pickup optical system and an image sensor as in the case of the lens-interchangeable camera, a satisfactory result cannot be obtained only by applying expression (2).

In each of the following embodiments, a configuration and a method of satisfactorily restoring the deterioration (degradation) of an image for arbitrary combinations of the image pickup optical system and the image sensor will be described.

Embodiment 1

Figure 1:
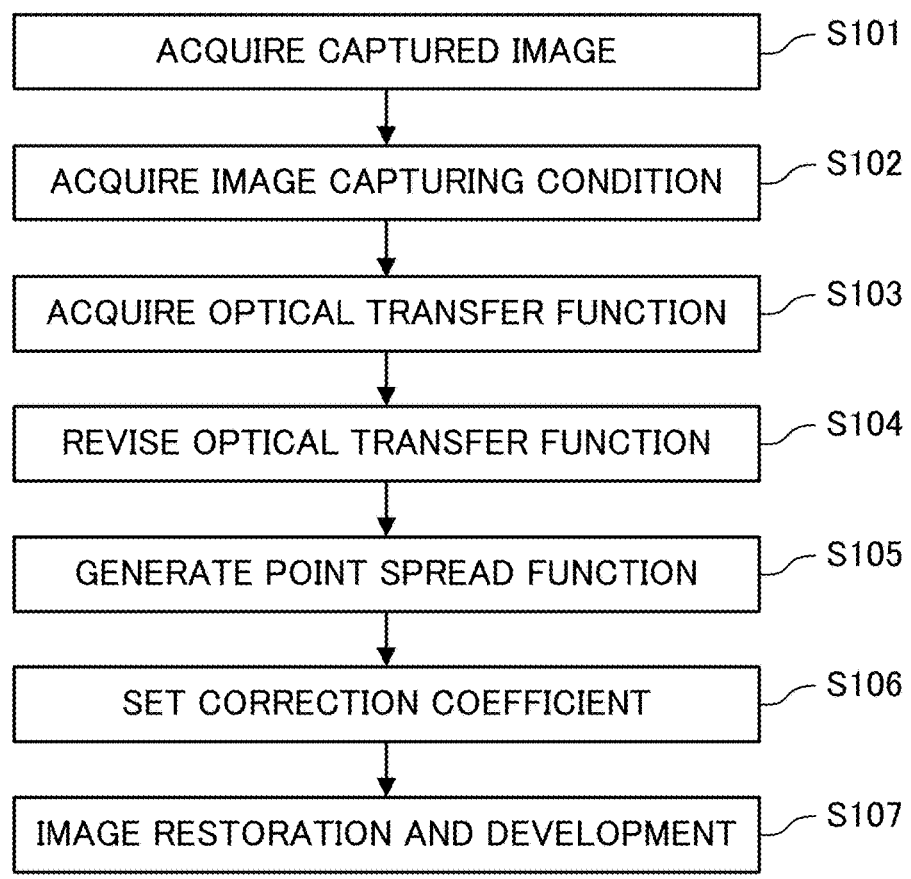
FIG. 1 is a flowchart of an image processing method in Embodiment 1.

First of all, referring to FIG. 1, an image processing method in Embodiment 1 of the present invention will be described. FIG. 1 is a flowchart of the image processing method in this embodiment. Each step in FIG. 1 is performed by each unit of an image processing apparatus.

First, at step S101, the image processing apparatus of this embodiment acquires an image (captured image) on which image restoration processing is to be performed. Subsequently, at step S102, the image processing apparatus acquires image capturing condition (image capturing condition information) to start the image restoration processing on the image acquired at step S101. In this embodiment, the image processing apparatus acquires the image capturing condition from information such as an Exif (Exchangeable image file format) added to the image acquired at step S101, or it directly acquires the image capturing condition. In this embodiment, the image capturing condition contains, as the image capturing condition of the image pickup optical system, a lens identification number (lens ID) to specify a lens used for capturing the image, a focal length at the time of capturing the image, an F number, and an object distance. The image processing apparatus can specify the optical transfer function of the image pickup optical system based on the image capturing condition which is a combination of the lens ID, the focal length, the F number, and the object distance.

As the image capturing condition, information indicating a situation at the time of capturing the image, such as information relating to an array of color filters and information relating to an optical low-pass filter, may be contained. The optical transfer function of the image pickup optical system is data discretized with a sampling pitch where a folding signal does not occur. It is preferred that the optical transfer function is for example calculated by simulation on a computer based on design data of a lens (image pickup optical system), or alternatively it may be measured by using an image sensor having a small pixel pitch. It is preferred that the pixel pitch in this case is a pixel pitch where the folding signal does not occur as described above. When generating the optical transfer function of the image pickup optical system by using the computer simulation, it is preferred that the optical transfer function calculated, for each wavelength, by using a spectral characteristic of an assumed light source and a spectral characteristic of the color filter of the image sensor is generated according to each of colors R, G, and B.

The number of the optical transfer functions of the image pickup optical system corresponds to the number of the combinations of the position on the image sensor and mainly the spectral characteristic of the color filters of R, G, and B when the focal length, the F number, and the object distance are determined as described above. In other words, the plurality of optical transfer functions are necessary for each image capturing condition. For example, the number of the combinations of one-hundred (100) representative points on the image sensor and the color filters of the three colors R, G, and B is 300. Accordingly, specifying the optical transfer functions of the image pickup optical system described above means specifying the 300 points.

Subsequently, at step S103, the image processing apparatus acquires the optical transfer function of the image pickup optical system based on the image capturing condition acquired at step S102. In this case, it is preferred that an acquisition range of the optical transfer function varies depending on a size of the image sensor which is to be used. The acquisition range of the optical transfer function is for example determined based on a ratio of a range determined depending on the image pickup optical system and a range in which the image sensor can acquire an optical image. The range determined depending on the image pickup optical system is for example a range in which an aberration correction is performed at the time of designing the image pickup optical system.

Subsequently, at step S104, the image processing apparatus revises (i.e., corrects) the optical transfer function acquired at step S103. The acquired optical transfer function of the image pickup optical system as it is cannot be applied to the image restoration processing. The image processing apparatus of this embodiment revises the optical transfer function of the image pickup optical system, with respect to various image sensors, depending on characteristics (frequency characteristics) of a band of each image sensor and a shape of the pixel. In order to revise the optical transfer function of the image pickup optical system depending on the characteristics of the image sensor, the following characteristics are considered.

First, as the characteristics of the image sensor, there are information relating to a size of the image sensor, a pixel pitch, an array of color filters, and the like. The size of the image sensor is information which specifies an image circle to cut out an optical aerial image. The pixel pitch is information relating to a folding signal of the optical transfer function. In addition to the information described above, a characteristic of an optical low-pass filter may be considered. The characteristic of the optical low-pass filter is information relating to the presence or absence of the optical low-pass filter and information relating to a characteristic affected by the optical transfer function according to the optical low-pass filter. For example, the information contains information relating to a separation width, a separation direction, a separation method, and the like of the point spread function by the optical low-pass filter. When a single plate sensor is used, array information of the R, G, and B pixels can be used as information on the folding signal for a sampling interval of the Bayer array. When the image sensor has the Bayer array, the sampling pitch of each of the R, G, and B pixels may be different from each other and the image sensor may have a special arrangement. Accordingly, the information can be considered as well. The information can be acquired as the image capturing condition (image capturing condition information) at step S102.

The optical transfer function revised depending on the characteristics of the image sensor at step S104 is represented by a model as expression (3) below.

$$H_S(u,v) = [H(u,v) \cdot \text{OLPF}(u,v) \cdot \text{PIX}(u,v)]_S \quad (3)$$

In expression (3), symbol $H_S(u,v)$ is an optical transfer function revised depending on the characteristics of the image sensor. Symbol $H(u,v)$ is an optical transfer function of the optical system, symbol $\text{OLPF}(u,v)$ is a frequency characteristic of the optical low-pass filter, and symbol $\text{PIX}(u,v)$ is a frequency characteristic depending on a pixel shape of the image sensor. Symbol $[\ ]_S$ denotes acquisition of the frequency characteristic within a band of the image sensor.

Subsequently, at step S105, the image processing apparatus performs a frequency conversion on each of the plurality of optical transfer functions revised at step S104 to convert them into data on a real space, and thus it generates point spread functions (PSFs) including the characteristic of the image sensor. Subsequently, at step S106, the image processing apparatus sets (determines) a correction coefficient (correction data) to be used for image restoration processing based on the PSF generated at step S105. More specifically, the image processing apparatus calculates the correction coefficient based on the PSF and it generates a correction coefficient map $C(x,y)$ for each position or region in an image. A characteristic (correction coefficient characteristic) of the correction coefficient map $C(x,y)$ is determined, based on the PSF, for each position or region in the image. In this embodiment, the image processing apparatus defines an image $f_{n+1}$ represented by expression (2) as indicated by expression (4) below by using an intermediate image $\text{ftemp}_{n+1}$.

$$\text{ftemp}_{n+1}(x,y) \leftarrow f_n(x,y) \int\int \frac{h(X-x, Y-y)g(X,Y)}{\int\int h(X-s, Y-t)f_n(s,t)dsdt} dXdY \quad (4)$$

Subsequently, at step S107, the image processing apparatus performs the image restoration processing by using the PSF generated at step S105 and expression (4), and then it performs development processing on a restored image. Expression (4) may be deformed including various regularizations. For example, as represented by expression (5) below, the image processing apparatus of this embodiment generates an image $f_{n+1}(x,y)$ by using the input image $f_n(x,y)$, the intermediate image ftemp$_{n+1}$, and the correction coefficient map $C(x,y)$.

$$f_{n+1}(x,y)=f_n(x,y)+C(x,y)\cdot\{ftemp_{n+1}(x,y)-f_n(x,y)\} \quad (5)$$

It is preferred that the image processing method of this embodiment is provided as a program which operates by software or on a hard ware.

According to the image processing method in this embodiment, a correction effect of the iterative processing can be controlled based on the PSF of the image pickup optical system. In other words, by controlling a correction amount for each iteration based on a capability of the image pickup optical system, a value of the correction coefficient map $C(x,y)$ is decreased in a significantly-deteriorated region to perform the correction little by little. Accordingly, it is possible to reduce an occurrence of a harmful effect such as ringing and artifact that occurs due to the processing in which a region where the deterioration of an image is large is significantly corrected at once.

Embodiment 2

Figure 2A:
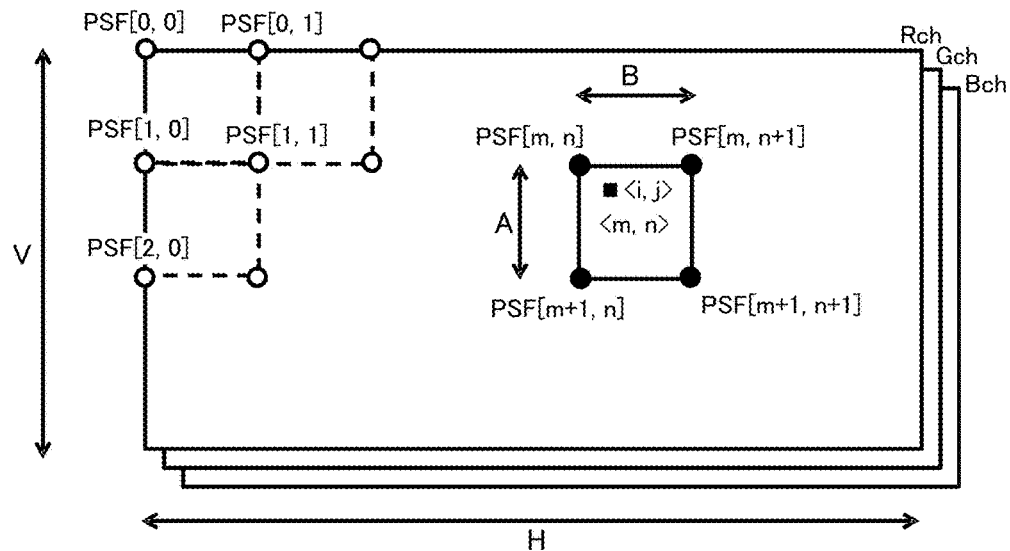
FIGS. 2A and 2B are explanatory diagrams of an image processing method which corrects a shift-variant deterioration characteristic in Embodiment 2.
Figure 2B:
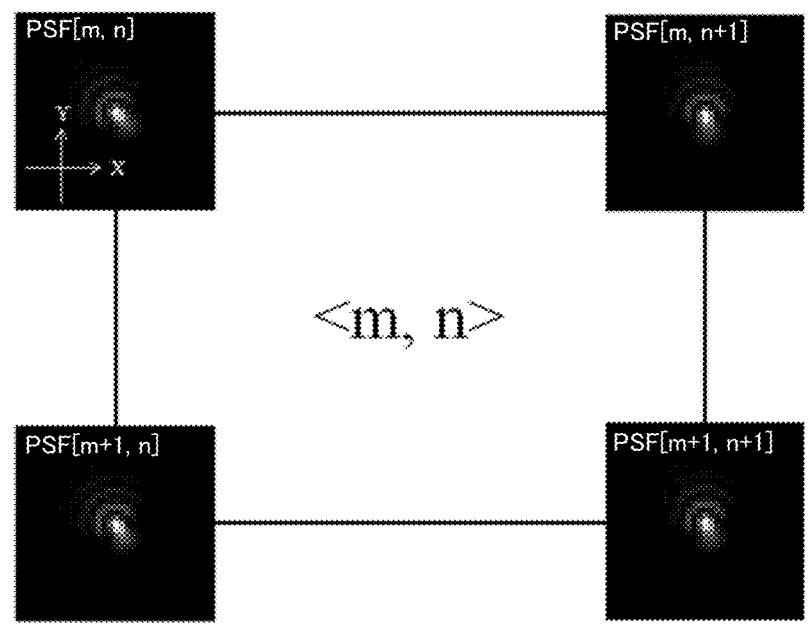

Next, referring to FIGS. 2A, 2B, 3 and 4, Embodiment 2 of the present invention will be described. FIGS. 2A and 2B are explanatory diagrams of an image processing method which corrects a shift-variant deterioration characteristic, and they illustrate an example of image restoration processing using a PSF that varies depending on a characteristic of an image sensor.

This embodiment will describe an image processing method in which a satisfactory result can be obtained in a case where a characteristic of the PSF significantly varies depending on a position in an image. When the PSF greatly changes depending on the position such as an image height in the image, ideally, the image processing is performed by using an appropriate (i.e., precise) PSF for each position in the image. However, storing data of the precise PSFs for all pixels of the image pickup element in a memory is not ideal. In this embodiment, with respect to each predetermined position in an image, an optical transfer function of the image pickup optical system corresponding to each position is revised (i.e., corrected) depending on the characteristic of the image pickup element. Then, the revised optical transfer function is converted into the PSF by frequency conversion to be used.

In this embodiment, as illustrated in FIG. 2A, the numbers of vertical and horizontal data of the R, G, and B of the image are denoted by V and H, respectively. When the R, G, and B are processed as the Bayer array, the numbers V and H may be different from each other. PSFs at M and N points are coordinated for the vertical and horizontal directions, respectively, and the respective intervals of the arrangement are defined as A and B, and a plurality of ((M−1)×(N−1)) rectangular regions are considered. It is preferred that A=V/(M−1) and B=H/(N−1) are satisfied for the purpose of calculation. In this case, by performing the integer division of i/A and j/B for each target pixel (i,j) to be processed, the rectangular region to which the PSF (target pixel) belongs among the plurality of rectangular regions can be calculated immediately without using processing such as conditional branching.

Accordingly, using m=i/A and n=j/B, four PSFs of PSF[m,n], PSF[m,n+1], PSF[m+1,n], and PSF[m+1,n+1] are selected. In this embodiment, a rectangle region (vertical length A and horizontal length B) having grid point positions of the selected four PSFs as vertexes is represented by a region <m,n>.

FIG. 2B illustrates the region <m,n> in FIG. 2A. The correction coefficient (correction data) for the region <m,n> is calculated based on four PSF kernels of the PSF[m,n], PSF[m,n+1], PSF[m+1,n], and PSF[m+1,n+1] corresponding to the grid point positions. X and Y coordinates in the PSF kernels are as illustrated in FIG. 2B.

In FIG. 2A, PSFs$_{ij}$ corresponding to the target pixel (i,j) are four PSFs of PSF[m,n], PSF[m,n+1], PSF[m+1,n], and PSF[m+1,n+1], and they can be calculated as follows.

In this embodiment, a weight W (weight coefficient) for each PSF is determined as follows.

$$W(m,n)=(A-a)*(B-b)/(A*B)$$

$$W(m,n+1)=(A-a)*b/(A*B)$$

$$W(m+1,n)=a*(B-b)/(A*B)$$

$$W(m+1,n+1)=a*b/(A*B)$$

In the above expressions, a=mod(i,A) and b=mod(j,B) are satisfied. Symbol mod(x,y) denotes a residue of x by y. As described above, expression (6) below is obtained.

$$PSF_{ij}(X,Y)=W(m,n)\cdot PSF[m,n](X,Y)+W(m,n+1)\cdot PSF[m,n+1](X,Y)+W(m+1,n)\cdot PSF[m+1,n](X,Y)+W(m+1,n+1)\cdot PSF[m+1,n+1](X,Y) \quad (6)$$

Then, by using expression (6), expression (7) below is obtained.

$$C(x,y)=\max\{PSF_{xy}(X,Y)\} \quad (7)$$

Figure 3:
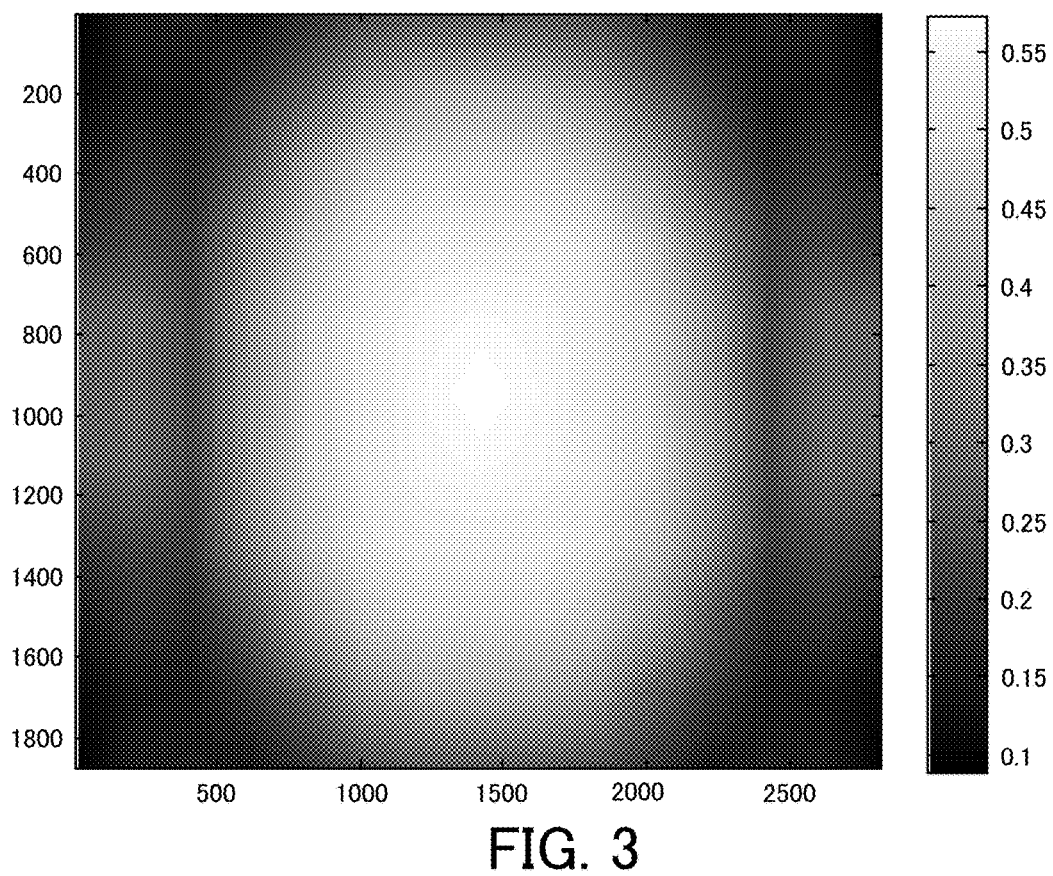
FIG. 3 is an example of a profile of a correction coefficient map in Embodiment 2.

FIG. 3 is an example of a profile of the correction coefficient map, and it illustrates the correction coefficient (correction data) for each position (region) in an image. A vertical axis and a horizontal axis in FIG. 3 indicate positions of an image in a vertical direction and a horizontal direction, respectively. The correction coefficient map $C(x,y)$ is a value optically based on an amount called a Strehl definition or a Strehl ratio. The correction coefficient map $C(x,y)$ indicates a value from 0 to 1 as a value indicating the capability of the image pickup optical system with respect to an image (x,y), and the capability is improved with increasing the value. Accordingly, in this embodiment, based on expression (6), expression (4) is used as represented by expression (8) below.

$$ftemp_{n+1}(x,y) \leftarrow f_n(x,y)\sum_X\sum_Y\frac{PSF_{ij}(X-x,Y-y)g(X,Y)}{\sum_s\sum_t PSF_{ij}(X-s,Y-t)f_n(s,t)} \quad (8)$$

In this embodiment, it is preferred that processing of matching centroid positions of the respective PSFs is previously performed in order to perform the processing of expression (8) with small numbers of M and N with high accuracy. Maximum values in addition to the centroid positions may be matched to correct the PSF so as to satisfy an evaluation value to evaluate both of them. For example, as represented by expression (5) above, the image processing apparatus of this embodiment generates an image $f_{n+1}(x,y)$ by using the input image $f_n(x,y)$, the intermediate image ftemp$_{n+1}$, and the correction coefficient map $C(x,y)$.

In this embodiment, the method of using the correction coefficient characteristic described above may be adopted in the middle of the iteration. In other words, if n<K (K is the number of iterations) is satisfied, expression (2) is used as represented by expression (9) below. On the other hand, if n≥k is satisfied, the image $f_{n+1}(x,y)$ is generated and obtained by using expressions (5) and (8).

$$f_{n+1}(x, y) \leftarrow f_n(x, y) \sum_X \sum_Y \frac{PSF_{ij}(X - x, Y - y)g(X, Y)}{\sum_s \sum_t PSF_{ij}(X - s, Y - t)f_n(s, t)} \quad (9)$$

Figure 4:
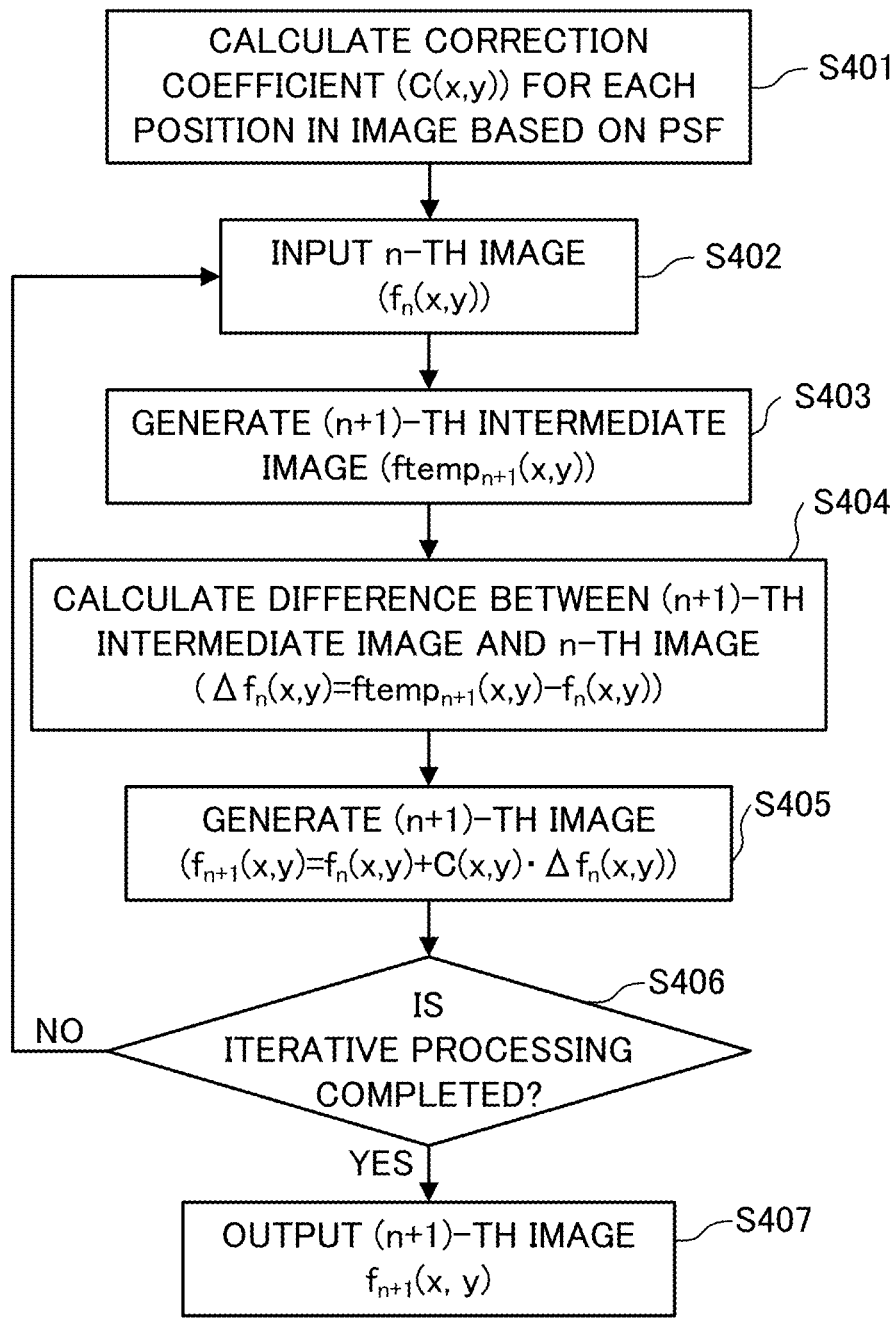
FIG. 4 is a flowchart of image restoration processing using a correction coefficient characteristic in Embodiment 2.

Next, referring to FIG. 4, the image restoration processing using the correction coefficient characteristic will be descried in detail. FIG. 4 is a flowchart of the image restoration processing using the correction coefficient characteristic. Each step in FIG. 4 is performed by the image processing apparatus (for example, the correction coefficient setter 607 for step S401, and the image restorer 608 for steps S402 to S407 as described below).

First, at step S401, the image processing apparatus (correction coefficient setter 607) calculates the correction coefficient (correction data) for each position (region) in the image based on the PSF. Step S401 corresponds to step S106 in FIG. 1. Subsequently, at step S402, the image processing apparatus (image restorer) inputs an n-th image $f_n(x,y)$. Subsequently, at step S403, the image processing apparatus generates an (n+1)-th intermediate image $ftemp_{n+1}(x,y)$.

Subsequently, at step S404, the image processing apparatus calculates a difference $\Delta f_n(x,y)$ between the intermediate image generated at step S402 and the image input at step S401 ($\Delta f_n(x,y)=ftemp_{n+1}(x,y)-f_n(x,y)$). Subsequently, at step S405, the image processing apparatus generates an (n+1)-th image $f_{n+1}(x,y)$ by using the difference $\Delta f_n(x,y)$ calculated at step S404 and the correction coefficient $C(x,y)$ (i.e., by using expression (5)).

Subsequently, at step S406, the image processing apparatus determines whether or not the iterative calculation is completed. When the iterative calculation is not completed, steps S402 to S406 are repeated. On the other hand, when the iterative calculation is completed, the flow proceeds to step S407, and the image processing apparatus outputs the (n+1)-th image $f_{n+1}(x,y)$.

According to the image processing apparatus in this embodiment, a correction effect of the iterative calculation processing can be controlled by using the Strehl definition (Strehl ratio) of the image pickup optical system corresponding to each position in an image. In other words, by controlling a correction amount for each iterative calculation processing based on a capability of the image pickup optical system, a value of the correction coefficient map $C(x,y)$ is relatively decreased in a significantly-deteriorated region to perform the correction little by little. Accordingly, it is possible to reduce an occurrence of a harmful effect such as ringing and artifact that occurs due to the processing in which a region where the deterioration of an image is large is significantly corrected at once.

Embodiment 3

Figure 5:
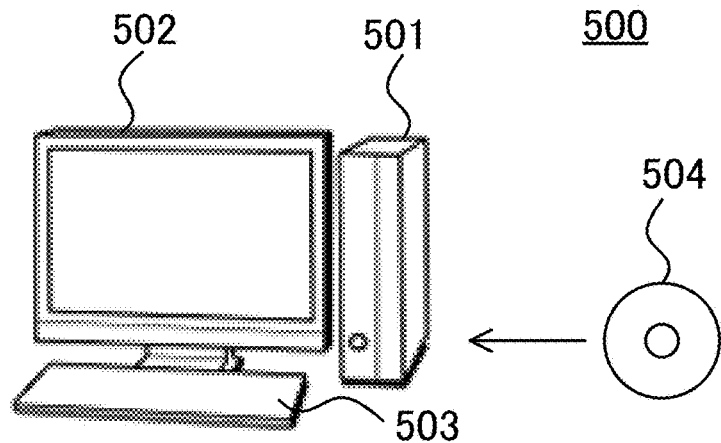
FIG. 5 is a configuration diagram of an image processing system in Embodiment 3.

Next, referring to FIG. 5, an image processing system (image processing apparatus) in Embodiment 3 of the present invention will be described. FIG. 5 is a configuration diagram of an image processing system 500 in this embodiment. The image processing system. 500 includes an image processing apparatus 501 (hardware as an information processing apparatus), a display device 502 (monitor), and an input device 503 (input unit such as a keyboard). This embodiment will describe a case in which the image processing method of Embodiment 1 or 2 operates on the image processing system 500 (software installed in a personal computer).

First, in order to cause the image processing apparatus 501 to operate the image processing method of Embodiment 1 or 2, the software (image processing program) which executes the image processing method is installed in the image processing apparatus 501 (personal computer). The software can be installed from a medium 504 (storage medium) such as a CD-ROM or a DVD-ROM. Alternatively, the software may be installed through download via a network (internet). The image processing apparatus 501 stores a plurality of optical transfer functions (optical transfer function data) of the image pickup optical system. The plurality of optical transfer functions stored in the image processing apparatus 501 are for example all the optical transfer functions for each of various image capturing conditions (image capturing condition information) of the image pickup optical system. The optical transfer functions are also downloaded via the medium 504 or the network to be stored in the image processing apparatus 501. In this embodiment, software (image processing program), and data such as optical transfer function information and image capturing condition information are stored in a storage such as a hard disk and a memory in the image processing apparatus 501. The image processing apparatus 501 can be configured to acquire at least part of data from an external server via the network.

The image processing apparatus 501 runs the installed software to perform the image restoration processing on the captured image. On the software, various settings (settings of parameters), such as the number of iteration times for determining the strength of the image restoration processing and the application of the image restoration processing only in a predetermined region (region where the image restoration processing is to be performed) of an image, are possible. It is preferred that a user can change these parameters while confirming the restored image on the display device 502.

Embodiment 4

Figure 6:
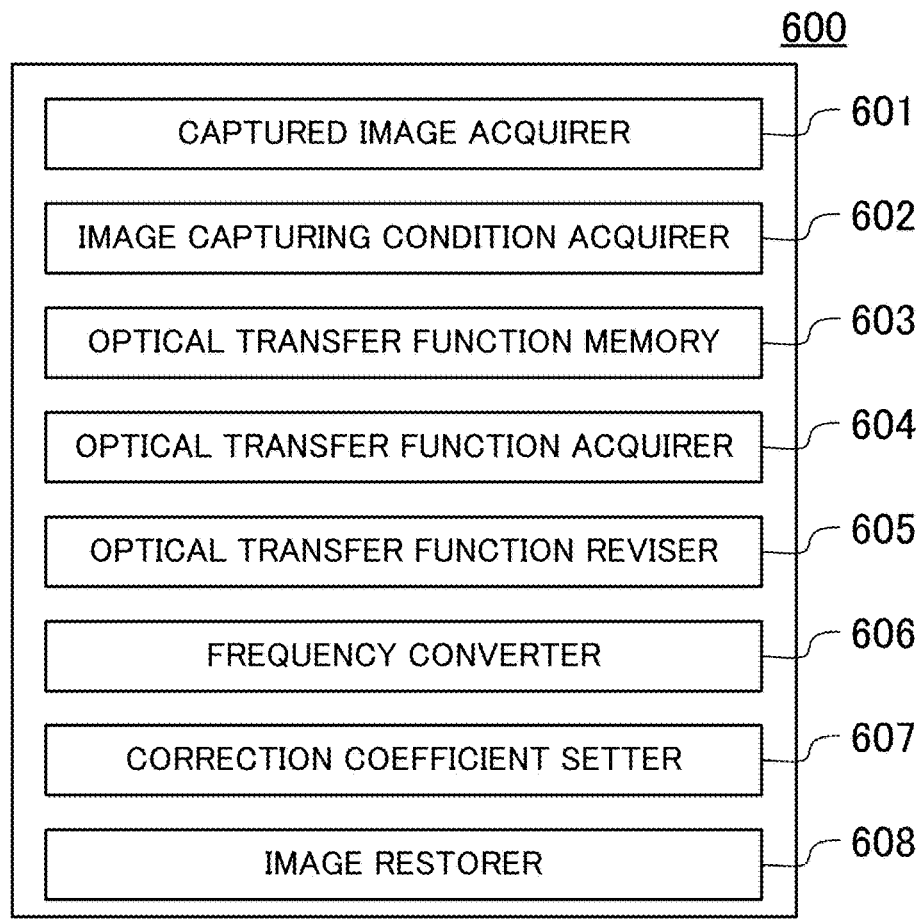
FIG. 6 is a block diagram of an image processing apparatus in Embodiment 4.

Next, referring to FIG. 6, an image processing apparatus in Embodiment 4 of the present invention will be described. FIG. 6 is a block diagram of an image processing apparatus 600 in this embodiment. The image processing apparatus 600 includes a captured image acquirer 601, an image capturing condition acquirer 602, an optical transfer function memory 603, an optical transfer function acquirer 604, an optical transfer function reviser 605, a frequency converter 606, a correction coefficient setter 607, and an image restorer 608.

The captured image acquirer 601 (image acquirer) acquires an image (captured image) to which information relating to an image capturing condition (image capturing condition information) is added (step S101 in FIG. 1). The image capturing condition acquirer 602 (condition acquirer) acquires, as the image capturing condition, information relating an image pickup optical system and information relating to an image sensor (step S102 in FIG. 1). The information relating to the image pickup optical system contains information relating to a focal length, an F number, an object distance, or the like, but it is not limited thereto, and it may contain information relating to a diameter of an image circle of the image pickup optical system. The diameter of the image circle of the image pickup optical system is a radius or a diameter of a unit circle which is predetermined for correcting aberrations at the time of designing the image pickup optical system. The information relating to the image sensor is information relating to a size of the image sensor (image height), a pixel pitch of the image sensor, a shape or a size of a pixel, or the like. In this embodiment, various elements (optical members) such as an optical low-pass filter may be provided in the image sensor. In this case, information relating to characteristics of the various elements can be contained in the information relating to the image sensor.

The optical transfer function memory 603 (memory) previously stores an optical transfer function (optical transfer function data) of the image pickup optical system. The optical transfer function acquirer 604 (function acquirer) acquires a plurality of optical transfer functions from the optical transfer function data stored in the optical transfer function memory 603 based on the information relating to the image pickup optical system acquired by the image capturing condition acquirer 602 (step S103 in FIG. 1). The optical transfer function reviser 605 (function reviser) revises (i.e., corrects), based on the information relating to the image sensor, the plurality of optical transfer functions acquired based on the information relating to the image pickup optical system (step S104 in FIG. 1). This revision contains providing a characteristic of the optical low-pass filter or the pixel, or processing of conversion into an optical transfer function up to a frequency band according to the pixel pitch of the image sensor.

The frequency converter 606 (PSF acquirer) performs the inverse Fourier transform of all the optical transfer functions revised by the optical transfer function reviser 605, and it generates a point spread function (PSF) depending on characteristics of the image pickup optical system and the image sensor (step S105 in FIG. 1). The correction coefficient setter 607 (determiner) calculates and sets, based on the point spread function generated by the frequency converter 606, a correction coefficient for each region (for each pixel position) where the point spread function corresponds (step S106 in FIG. 1, or step S401 in FIG. 4). In other words, the correction coefficient setter 607 determines the correction coefficient (correction data) corresponding to each of a plurality of regions based on the point spread function (degree of blur) relating to each of the plurality of regions in an image.

The image restorer 608 performs image restoration processing by using the image acquired by the captured image acquirer 601 and the point spread function generated by the frequency converter 606, based on the correction coefficient set for each region corresponding to the point spread function (step S107 in FIG. 1). In other words, the image restorer 608 repeats (iterates) predetermined image processing (for example, steps S402 to S406 in FIG. 4) to perform the image restoration processing for each of the plurality of regions based on the correction coefficient determined by using the point spread function.

The captured image acquirer 601 acquires the image (captured image), and the image capturing condition information may not be added to the captured image in some cases. Accordingly, in this embodiment, the image processing apparatus 600 can be configured such that the captured image and the image capturing condition are acquired separately. In this case, the image capturing condition acquirer 602 can acquire the image capturing condition information separately from the captured image (for example, via an image pickup optical system controller 706 or a state detector 707 of an image pickup apparatus 700 illustrated in FIG. 7).

Embodiment 5

Figure 7:
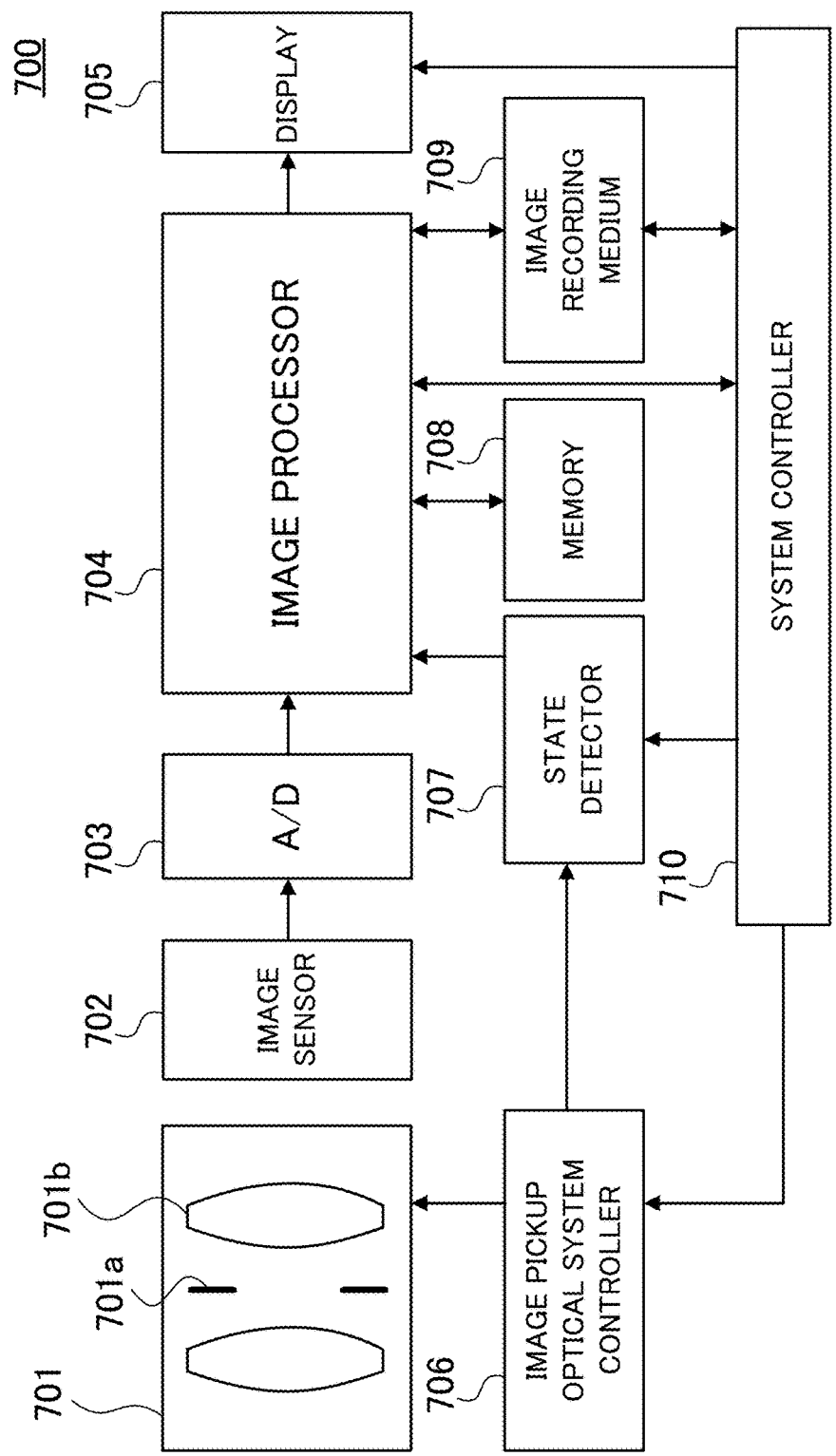
FIG. 7 is a block diagram of an image pickup apparatus in Embodiment 5.

Next, referring to FIG. 7, an outline of an image pickup apparatus in Embodiment 5 of the present invention will be described. FIG. 7 is a block diagram of an image pickup apparatus 700 in this embodiment. The image pickup apparatus 700 includes an image processor 704 (image processing apparatus) capable of performing the image processing method of each embodiment described above.

In the image pickup apparatus 700, an object (not illustrated) is imaged on an image sensor 702 (image pickup element) via an image pickup optical system 701 (optical system) including an aperture stop 701a (or light shielding member) and a focus lens 701b. In this embodiment, the image pickup optical system 701 is an interchangeable lens (lens apparatus) removably mounted on an image pickup apparatus body including the image sensor 702. This embodiment, however, is not limited to this, and can be applied also to an image pickup apparatus including an image pickup apparatus body and an image pickup optical system 701 integrated with each other.

An aperture value (F number) is determined by the aperture stop 701a or the light shielding member. The image sensor 702 photoelectrically converts an object image (optical image) formed via the image pickup optical system 701 to output an image signal (captured image data). An electric signal output from the image sensor 702 is output to an A/D converter 703. The A/D converter 703 converts the electric signal (analog signal) input from the image sensor 702 to a digital signal (captured image) and then outputs the digital signal to the image processor 704. The image sensor 702 and the A/D converter 703 constitute an image pickup unit configured to photoelectrically convert the optical image (object image) formed via the image pickup optical system 701 to output the captured image.

The image processor 704 performs predetermined image processing on the digital signal output from the A/D converter 703, i.e., image generated based on the image signal output from the image sensor 702, by using information of a state detector 707 and a memory 708. Especially, the image processor 704 of this embodiment performs image restoration processing on the captured image to output a corrected image (restored image). The image processor 704 includes units having the same functions as the captured image acquirer 601, the image capturing condition acquirer 602, the optical transfer function memory 603, the optical transfer function acquirer 604, the optical transfer function reviser 605, the frequency converter 606, the correction coefficient setter 607, and the image restorer 608.

The memory 708 (storage unit) stores an optical transfer function (optical transfer function data) of the image pickup optical system 701 for each image capturing condition (image capturing condition information), i.e., for each of combinations of a focal length at the time of capturing an image, an F number, an image capturing distance, and an image height. The memory 708 has the same function as the optical transfer function memory 603 illustrated in FIG. 6. The image capturing condition is for example acquired by the image pickup optical controller 706 or the state detector 707. In this embodiment, the image processor 704 and the memory 708 constitute the image processing apparatus. In this embodiment, the optical transfer function memory can be included in the image processor 704, instead of the memory 708 provided outside the image processor 704.

The image processor 704 acquires the optical transfer function of the image pickup optical system corresponding to the acquired image capturing condition, and it revises the optical transfer function of the image pickup optical system by using the information relating to the image sensor. Then, the image processor 704 (frequency converter 606) performs the inverse Fourier transform on the revised optical transfer function, and it generates the point spread function depending on characteristics of the image pickup optical system and the image sensor. The image processor 704 (correction coefficient setter 607) calculates and sets the correction coefficient for each region where the point spread function corresponds (for each pixel position) based on the generated point spread function. Then, the image processor 704 (image restorer 608) reads image data from the memory 708, and it performs the image restoration processing based on the correction coefficient set for each region by using the point spread function depending on the characteristics of the image pickup optical system and the image sensor. In the image restoration processing, various settings (settings of parameters), such as application of the image restoration processing only in a predetermined region (region where the image restoration processing is to be performed) of an image, are possible. It is preferred that a user can change these parameters while confirming the restored image on the display 705.

The output image (restored image) processed by the image processor 704 is recorded in an image recording medium 709 in a predetermined format. A display 705 displays an image obtained by performing predetermined processing for display on the processed image in this embodiment. Alternatively, the display 705 may display a simply-processed image for high-speed display. The display 705 also displays a GUI to select an image restoration mode or a normal image capturing mode by a user. When the image restoration mode is selected by the user via the GUI on the display 705, a system controller 710 controls the image processor 704 to perform the image processing method of Embodiment 1 or 2.

The system controller 710 includes a CPU, an MPU, or the like, and it controls a whole of the image pickup apparatus 700. More specifically, the system controller 710 controls each of the image processor 704, the display 705, the image pickup optical system controller 706, the state detector 707, and the image recording medium 709. The image pickup optical system controller 706 controls the motion of the image pickup optical system 701. The state detector 707 detects a state of the image pickup optical system. 701 based on information of the image pickup optical system controller 706. In the image pickup apparatus 700, software (an image processing program) that realizes the image processing method described above can be supplied to the system controller 710 via a network or a storage medium, and then the system controller 710 can read out and execute the image processing program.

As described above, in each embodiment, the image processing apparatus 600 includes the determiner (correction coefficient setter 607) and the image restorer (image restorer 608). The determiner determines correction data (correction coefficient) for each of a plurality of regions (i.e., positions) in an image based on a point spread function (PSF) relating to each of the plurality of positions. The image restorer repeats (iterates) predetermined image processing by using the correction data to perform image restoration processing.

Preferably, the image restorer repeats the predetermined image processing N times (N is a positive integer) to perform the image restoration processing. The predetermined image processing includes processing (S403) of generating an (n+1)-th intermediate image based on an n-th image ($1<n \leq N$), and processing (S405) of generating an (n+1)-th image based on the (n+1)-th intermediate image, the n-th image, and the correction data. The correction data are coefficient data for a difference between the (n+1)-th intermediate image and the n-th image. Preferably, the correction data include information relating to a correction amount while the predetermined image processing is repeated. The plurality of regions include a first region (first position) and a second region (second position) where a deterioration amount (degradation amount) is larger than a deterioration amount at the first region. The determiner sets, as the correction data, first correction data and second correction data for the first region and the second region, respectively. A correction amount by the second correction data is smaller than a correction amount by the first correction data.

Preferably, the image processing apparatus includes the image acquirer (captured image acquirer 601) which acquires an image and the PSF acquirer (frequency converter 606) which acquires the point spread function. More preferably, the PSF acquirer acquires the point spread function that varies depending on a pixel position of the image sensor. Preferably, the image processing apparatus includes the condition acquirer (image capturing condition acquirer 602) which acquires image capturing condition information of the image. The PSF acquirer acquires the point spread function based on the image capturing condition information.

Preferably, the image restorer specifies a plurality of point spread functions corresponding to a target pixel of the image sensor from among the plurality of point spread functions acquired by the PSF acquirer, and it performs the image restoration processing for each target pixel. More preferably, the image restorer determines weight information that is to be applied to the plurality of point spread functions corresponding to the target pixel, and it performs the image restoration processing for each target pixel based on the weight information.

Preferably, the determiner determines the correction data based on a maximum value of the point spread function relating to each of the plurality of positions. Preferably, the determiner determines the correction data based on the maximum value of the point spread function sampled based on the Nyquist frequency. Preferably, the determiner relates the plurality of point spread functions to each of the plurality of regions to determine the correction data for each of the plurality of regions based on the plurality of point spread functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, with respect to an arbitrary combination of an image pickup optical system and an image sensor, an image processing apparatus, an image pickup apparatus, an image processing method, and a non-transitory computer-readable storage medium which are capable of restoring a deterioration of an image appropriately depending on a position in an image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-147007, filed on Jul. 24, 2015, which is hereby incorporated by reference herein in its entirety.

What is claimed is:

1. An image processing apparatus comprising:
at least one processor configured to execute a plurality of tasks, including:
an image acquiring task that acquires an image;
a PSF acquiring task that acquires a point spread function relating to each of a plurality of pixel positions of an image sensor;
a correction data determining task that determines correction data for each of the plurality of pixel positions of the image sensor based on the acquired point spread function relating to each of the plurality of pixel positions of the image sensor; and
an image restoring task that:
calculates image correction data for each position of the acquired image based on the plurality of point spread functions acquired by the PSF acquiring task; and
repeats a predetermined image processing using the image correction data N times, where N is a positive integer, to perform an image restoration processing for the each position to restore the acquired image,
wherein the predetermined image processing includes:
processing of generating an (n+1)-th intermediate image based on an n-th image (1<n≤N); and
processing of generating an (n+1)-th image based on the (n+1)-th intermediate image, the n-th image, and the image correction data,
wherein the image correction data are coefficient data for a difference between the (n+1)-th intermediate image and the n-th image; and
an outputting task that outputs the restored acquired image.

2. The image processing apparatus according to claim 1, wherein:
the image correction data include information relating to a correction amount while the predetermined image processing is repeated,
the acquired image includes a first position and a second position where a deterioration amount is larger than a deterioration amount at the first position,
the correction data determining task is configured to set, as the correction data, first correction data and second correction data corresponding to the first position and the second position, respectively, and
an image correction amount based on the second correction data is smaller than an image correction amount based the first correction data.

3. The image processing apparatus according to claim 1, wherein each of the acquired plurality of point spread functions varies depending on a pixel position of the image sensor.

4. The image processing apparatus according to claim 1, wherein:
the plurality of tasks includes a condition acquiring task that acquires image capturing condition information of the acquired image, and
the PSF acquiring task acquires the point spread function based on the image capturing condition information.

5. The image processing apparatus according to claim 1, wherein the image restoring task further:
specifies a plurality of point spread functions corresponding to a target pixel of an image sensor from among the plurality of point spread functions acquired by the PSF acquiring task;
determines weight information that is to be applied to the plurality of point spread functions corresponding to each target pixel; and
performs the image restoration processing for the each position of the acquired image based on the corresponding each target pixel based on the weight information.

6. The image processing apparatus according to claim 1, wherein the correction data determining task determines the correction data based on a maximum value of the point spread function relating to each of the plurality of pixel positions.

7. The image processing apparatus according to claim 1, wherein the correction data determining task determines the correction data based on a maximum value of each of the plurality of point spread functions sampled based on a Nyquist frequency.

8. The image processing apparatus according to claim 1, wherein the correction data determining task relates the plurality of point spread functions to each of the plurality of pixel positions to determine the correction data for each of the plurality of positions based on the plurality of point spread functions.

9. An image pickup apparatus comprising:
an image sensor configured to photoelectrically convert an optical image formed via an image pickup optical system and output an image signal;
at least one processor configured to execute a plurality of tasks, including:
an image acquiring task that acquires an image;
a PSF acquiring task that acquires a point spread function relating to each of a plurality of pixel positions of the image sensor;
a correction data determining task that determines correction data for each of the plurality of pixel positions of the image sensor based on the acquired point spread function relating to each of the plurality of pixel positions of the image sensor; and an image restoring task that:
    calculates image correction data for each position of the acquired image based on the plurality of point spread functions acquired by the PSF acquiring task; and
    repeats a predetermined image processing using the image correction data N times, where N is a positive integer, to perform an image restoration processing for the each position to restore the acquired image,
    wherein the predetermined image processing includes:
        processing of generating an (n+1)-th intermediate image based on an n-th image ($1 < n \leq N$); and
        processing of generating an (n+1)-th image based on the (n+1)-th intermediate image, the n-th image, and the image correction data,
        wherein the image correction data are coefficient data for a difference between the (n+1)-th intermediate image and the n-th image; and
    an outputting task that outputs the restored acquired image.

10. An image processing method for an image processing apparatus having at least one processor configured to execute a plurality of method steps, including:
    an image acquiring step of acquiring an image;
    a PSF acquiring step of acquiring a point spread function relating to each of a plurality of pixel positions of an image sensor;
    a correction determining step of determining correction data for each of the plurality of pixel positions of the image sensor based on the acquired point spread function relating to each of the plurality of pixel positions of the image sensor;
    a calculating step of calculating image correction data for each position of the acquired image based on the plurality of point spread functions acquired in the PSF acquiring step;
    a processing repeating step of repeating a predetermined image processing using the image correction data N times, where N is a positive integer to perform an image restoration processing for the each position to restore the acquired image; and
    a processing step of performing the predetermined image processing by the steps of:
        generating an (n+1)-th intermediate image based on an n-th image ($1 < n \leq N$); and
        generating an (n+1)-th image based on the (n+1)-th intermediate image, the n-th image, and the image correction data,
        wherein the image correction data are coefficient data for a difference between the (n+1)-th intermediate image and the n-th image; and
    an outputting step of outputting the restored acquired image.

11. A non-transitory computer-readable storage medium storing a program executable by a computer to execute a method comprising a plurality of method steps, including:
    an image acquiring step of acquiring an image;
    a PSF acquiring step of acquiring a point spread function relating to each of a plurality of pixel positions of an image sensor;
    a correction determining step of determining correction data for each of the plurality of pixel positions of the image sensor based on the acquired point spread function relating to each of the plurality of pixel positions of the image sensor;
    a calculating step of calculating image correction data for each position of the acquired image based on the plurality of point spread functions acquired in the PSF acquiring step;
    a processing repeating step of repeating a predetermined image processing using the image correction data N times, where N is a positive integer to perform an image restoration processing for the each position to restore the acquired image; and
    a processing step of performing the predetermined image processing by the steps of:
        generating an (n+1)-th intermediate image based on an n-th image ($1 < n \leq N$); and
        generating an (n+1)-th image based on the (n+1)-th intermediate image, the n-th image, and the image correction data,
        wherein the image correction data are coefficient data for a difference between the (n+1)-th intermediate image and the n-th image; and
    an outputting step of outputting the restored acquired image.

* * * * *